United States Patent
Pautis

(10) Patent No.: US 11,215,142 B2
(45) Date of Patent: Jan. 4, 2022

(54) NACELLE OF A TURBOJET COMPRISING A REVERSER FLAP AND A DEPLOYMENT SYSTEM WITH DELAY

(71) Applicant: Airbus Operations SAS, Toulouse (FR)

(72) Inventor: Olivier Pautis, Merville (FR)

(73) Assignee: AIRBUS OPERATIONS SAS, Toulouse (FR)

(*) Notice: Subject to any disclaimer, the term of this patent is extended or adjusted under 35 U.S.C. 154(b) by 94 days.

(21) Appl. No.: 16/714,986

(22) Filed: Dec. 16, 2019

(65) Prior Publication Data

US 2020/0240360 A1 Jul. 30, 2020

(30) Foreign Application Priority Data

Dec. 20, 2018 (FR) ...................................... 1873541

(51) Int. Cl.
*F02K 1/72* (2006.01)
*F02K 1/08* (2006.01)
*F02K 1/76* (2006.01)

(52) U.S. Cl.
CPC .................. *F02K 1/72* (2013.01); *F02K 1/08* (2013.01); *F02K 1/763* (2013.01)

(58) Field of Classification Search
CPC . F02K 1/605; F02K 1/62; F02K 1/625; F02K 1/70; F02K 1/72; F02K 1/763
See application file for complete search history.

(56) References Cited

U.S. PATENT DOCUMENTS

| 5,097,662 A | 3/1992 | Vieth |
| 5,309,711 A | 5/1994 | Matthias |
| 5,778,659 A | 7/1998 | Duesler et al. |
| 7,484,356 B1 | 2/2009 | Lair |
| 2009/0193789 A1* | 8/2009 | Pero .......................... F02K 1/70 60/226.2 |
| 2016/0160798 A1 | 6/2016 | Guerin et al. |
| 2019/0003420 A1* | 1/2019 | Pautis ..................... F02K 1/763 |

(Continued)

FOREIGN PATENT DOCUMENTS

WO 2015019007 A1 2/2015

OTHER PUBLICATIONS

French Search Report, priority document.

*Primary Examiner* — Gerald L Sung
(74) *Attorney, Agent, or Firm* — Greer, Burns & Crain, Ltd.

(57) ABSTRACT

A bypass turbojet nacelle comprising a fixed structure, a fixed cowl and a cowl movable in translation between advanced and withdrawn positions by a ram with a reverser flap movable thereon, and a deployment system comprising a first slider integral with the movable cowl, a first groove comprising a first part and a curved, second part integral with the fixed structure, a second slider movable in translation in the second groove part, a first connecting rod rotatable on the first slider and on the second slider, and a second connecting rod articulated on both the first connecting rod first end and the reverser flap. The ram rod is articulated on the first connecting rod. Moving the first slider from the advanced to the withdrawn position moves the second slider along the first part and, when the first slider reaches the withdrawn position, the second slider moves along the second part.

9 Claims, 6 Drawing Sheets

(56) References Cited

U.S. PATENT DOCUMENTS

| | | | |
|---|---|---|---|
| 2019/0003421 A1* | 1/2019 | Pautis | F02K 3/06 |
| 2019/0024609 A1* | 1/2019 | Chuck | F02K 1/72 |
| 2020/0018258 A1* | 1/2020 | Aziz | F02K 1/72 |
| 2020/0284220 A1* | 9/2020 | Le Boulicaut | F02K 1/72 |

* cited by examiner

NACELLE OF A TURBOJET COMPRISING A REVERSER FLAP AND A DEPLOYMENT SYSTEM WITH DELAY

CROSS-REFERENCES TO RELATED APPLICATIONS

This application claims the benefit of the French patent application No. 1873541 filed on Dec. 20, 2018, the entire disclosures of which are incorporated herein by way of reference.

FIELD OF THE INVENTION

The present invention relates to a nacelle of a bypass turbojet that comprises at least one reverser flap and a deployment system with delay, a bypass turbojet comprising such a nacelle and an engine, and also an aircraft comprising at least one such bypass turbojet.

BACKGROUND OF THE INVENTION

An aircraft comprises a fuselage, on each side of which a wing is fixed. At least one bypass turbojet is suspended under each wing. Each bypass turbojet is fixed under the wing by means of a pylon that is fixed between the structure of the wing and the structure of the bypass turbojet.

The bypass turbojet comprises an engine, a nacelle that is fixed around the engine, and a secondary duct that is between the engine and the nacelle and that allows the passage of a secondary flow.

The nacelle comprises a fixed cowl and a movable cowl at the rear of the fixed cowl which is movable in translation between an advanced position and a withdrawn position. In the advanced position, the movable cowl is close to the fixed cowl and forms an aerodynamic continuity. In the withdrawn position, the movable cowl is remote from the fixed cowl towards the rear and creates an opening between the secondary duct and the exterior.

The nacelle also comprises at least one reverser flap that is movable between a stowed position, in which it is positioned outside the secondary duct such as not to impede the secondary duct, and a deployed position, in which it is positioned across the secondary duct such as to impede the secondary duct in order to direct it radially through the opening towards the exterior of the nacelle.

Conventionally, the reverser flap is mounted to move in rotation on the structure of the nacelle and a deployment system moves it from the stowed position to the deployed position when the movable cowl passes from the advanced position to the withdrawn position and vice versa.

Although the system for deploying such a reverser flap is entirely satisfactory, it is desirable to identify different deployment systems and, in particular, a deployment system that makes it possible to delay the deployment of the reverser flap relative to the movement of the movable cowl. Furthermore, it is desirable to identify a deployment system that comprises fewer mechanical members traversing the secondary duct and that makes it possible to optimize the form of the movable cowl, in particular making it thinner and thus making the nacelle more aerodynamic.

SUMMARY OF THE INVENTION

An object of the present invention is to propose a nacelle comprising at least one reverser flap and a deployment system with delay.

To that end, a nacelle for a bypass turbojet is proposed, said nacelle comprising:
a fixed structure,
a fixed cowl mounted immovably on the fixed structure and a movable cowl that is movable in translation relative to the fixed structure in a translational direction between an advanced position, in which it is close to the fixed cowl, and a withdrawn position, in which it is remote from the fixed cowl towards the rear, such as to define therebetween an opening connecting a duct of a secondary flow and the exterior of the nacelle,
a ram designed to move the movable cowl from the advanced position to the withdrawn position, and vice versa,
an reverser flap mounted to move in rotation about a principal axis of rotation on the movable cowl, between a stowed position in which it is positioned outside the secondary duct and a deployed position in which it is across the duct, and
a deployment system provided such as to coordinate and to delay passage from the stowed position to the deployed position of the reverser flap with passage from the advanced position to the withdrawn position of the movable cowl, and vice versa, said deployment system comprising:
a first slide bar integral with the movable cowl,
guide means designed to guide the first slide bar in translation parallel to the translational direction relative to the fixed structure between two stop positions, one corresponding to the advanced position and the other to the withdrawn position,
a first groove comprising a first part parallel to the translational direction and a curved, second part, in which the first groove is integral with the fixed structure,
a second slide bar mounted to move in translation in the first groove,
a first connecting rod mounted to move in rotation on the first slide bar about a first axis of rotation and comprising a first end, in which the first connecting rod is mounted to move in rotation on the second slide bar between the first slide bar and the first end about a second axis of rotation, and
a second connecting rod, a first end of which is mounted in an articulated manner on the first end of the first connecting rod about a third axis of rotation, and a second end of which is mounted in an articulated manner on the reverser flap about a fourth axis of rotation,
wherein the rod of the ram is mounted in an articulated manner on the first connecting rod, and
wherein, when the first slide bar moves from the stop position corresponding to the advanced position to the stop position corresponding to the withdrawn position, being guided by the guide means, the second slide bar moves along the first part of the first groove and, from the moment when the first slide bar reaches the withdrawn position, the second slide bar moves along the second part of the first groove.

The particular form of the first slide allows an offset between the translation of the movable cowl and the rotation of the reverser flap, making it possible to distance the reverser flap towards the rear before it pivots.

Advantageously, the guide means take the form of a second groove in and along which the first slide bar slides, the second groove is arranged along an axis parallel to the translational direction and is integral with the fixed structure, and the ends of the second groove are blocked such as to limit the movement of the first slide bar between said ends.

Advantageously, the rod of the ram is mounted in an articulated manner on the first connecting rod between the first end and the second axis of rotation and about a fifth axis of rotation.

Advantageously, all the axes of rotation are parallel to the principal axis of rotation.

Advantageously, the nacelle comprises cascades integral with the movable cowl and, in the withdrawn position, they are positioned across the opening.

Advantageously, the first connecting rod has a second end that is on the other side of the first end relative to the first axis of rotation and the deployment system comprises a draw spring fixed between the second end and the movable cowl.

The invention also proposes a bypass turbojet comprising an engine and a nacelle, according to one of the preceding variants, that surrounds the engine, and wherein the duct is delimited between the nacelle and the engine.

The invention also proposes an aircraft comprising at least one bypass turbojet according to the preceding variant.

BRIEF DESCRIPTION OF THE DRAWINGS

The above-mentioned features of the invention, and also other features, will become more clearly apparent upon reading the following description of an exemplary embodiment, said description being given in relation to the appended drawings, in which.

DETAILED PRESENTATION OF EMBODIMENTS

Figure 1:
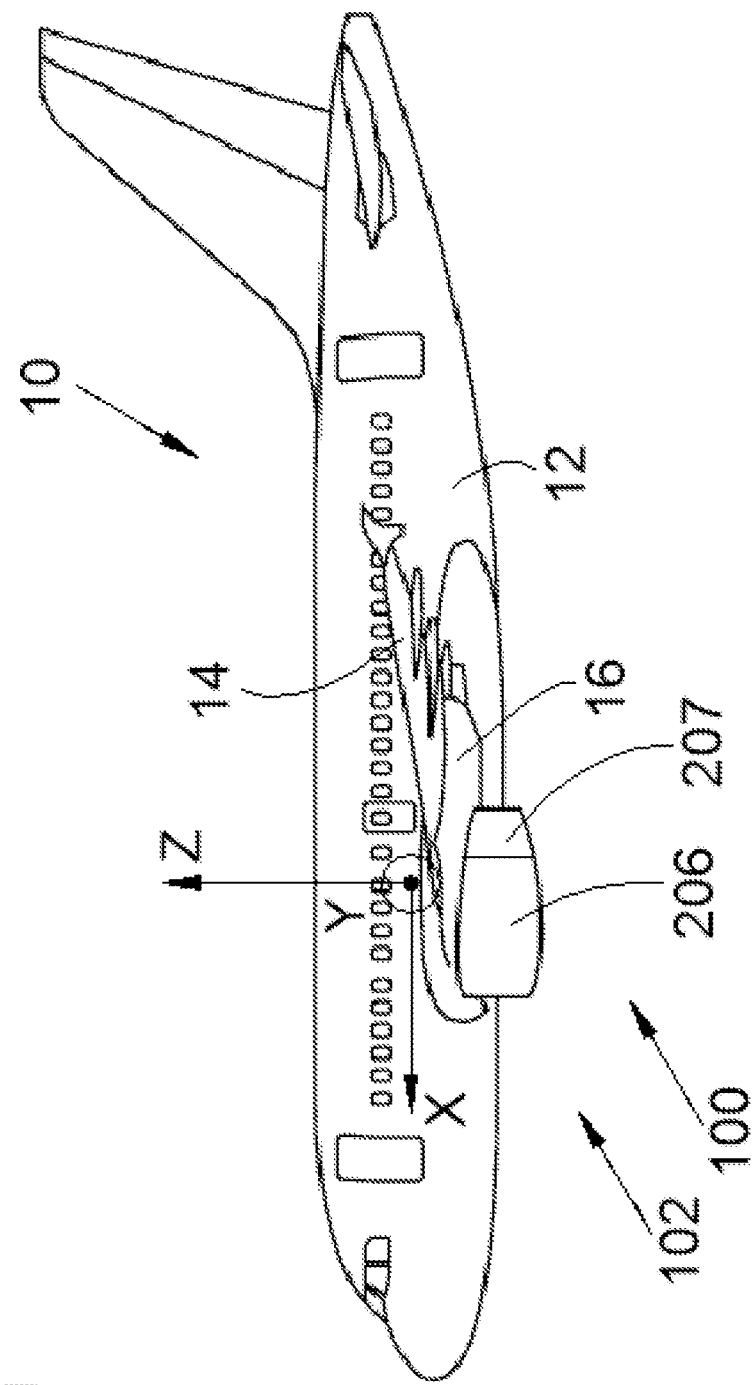
FIG. 1 is a side view of an aircraft comprising a nacelle according to the invention.
Figure 2:
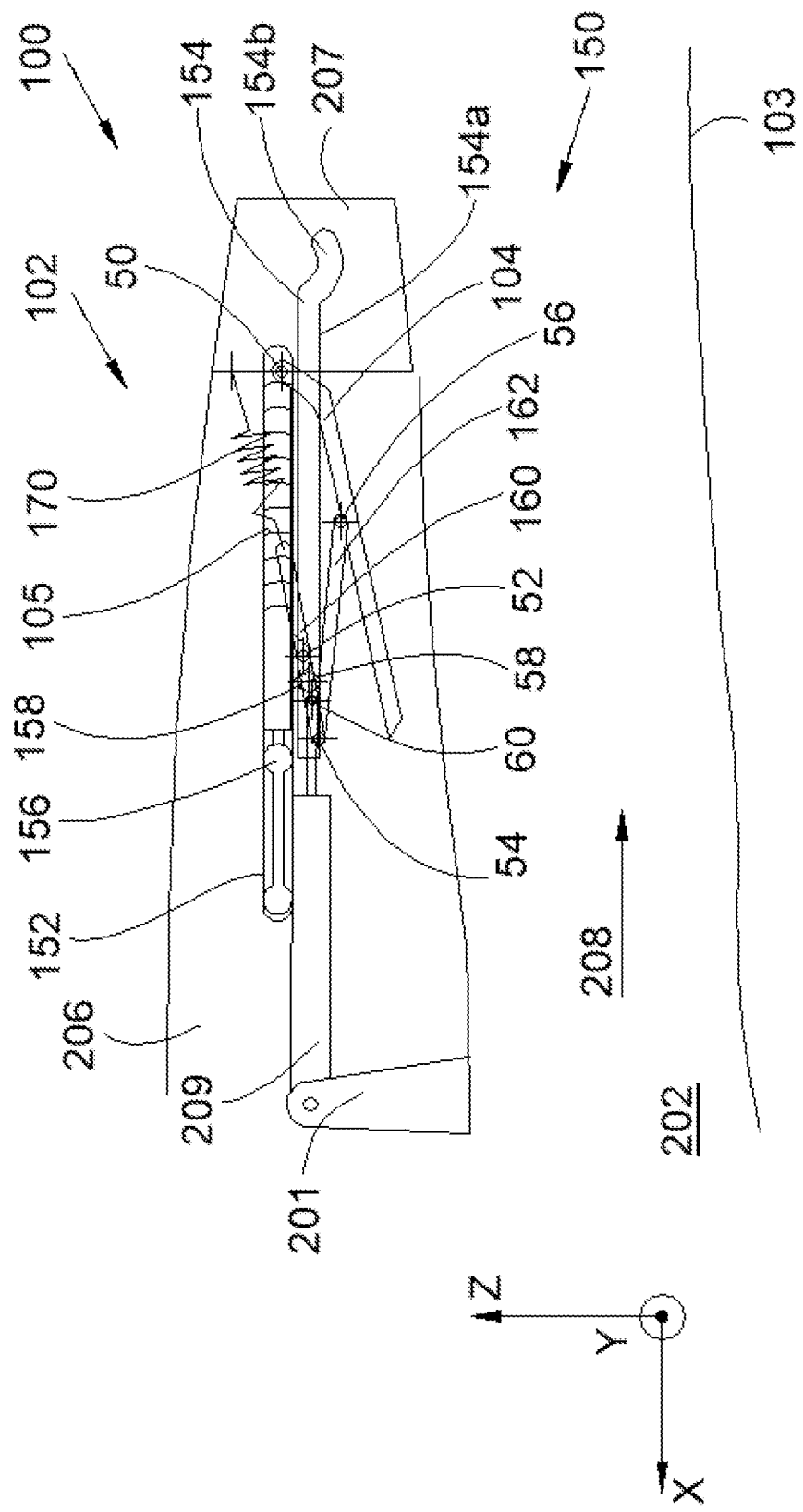
FIG. 2 is a sectional view in a vertical plane of the nacelle according to the invention in the advanced position and in the stowed position.
Figure 3:
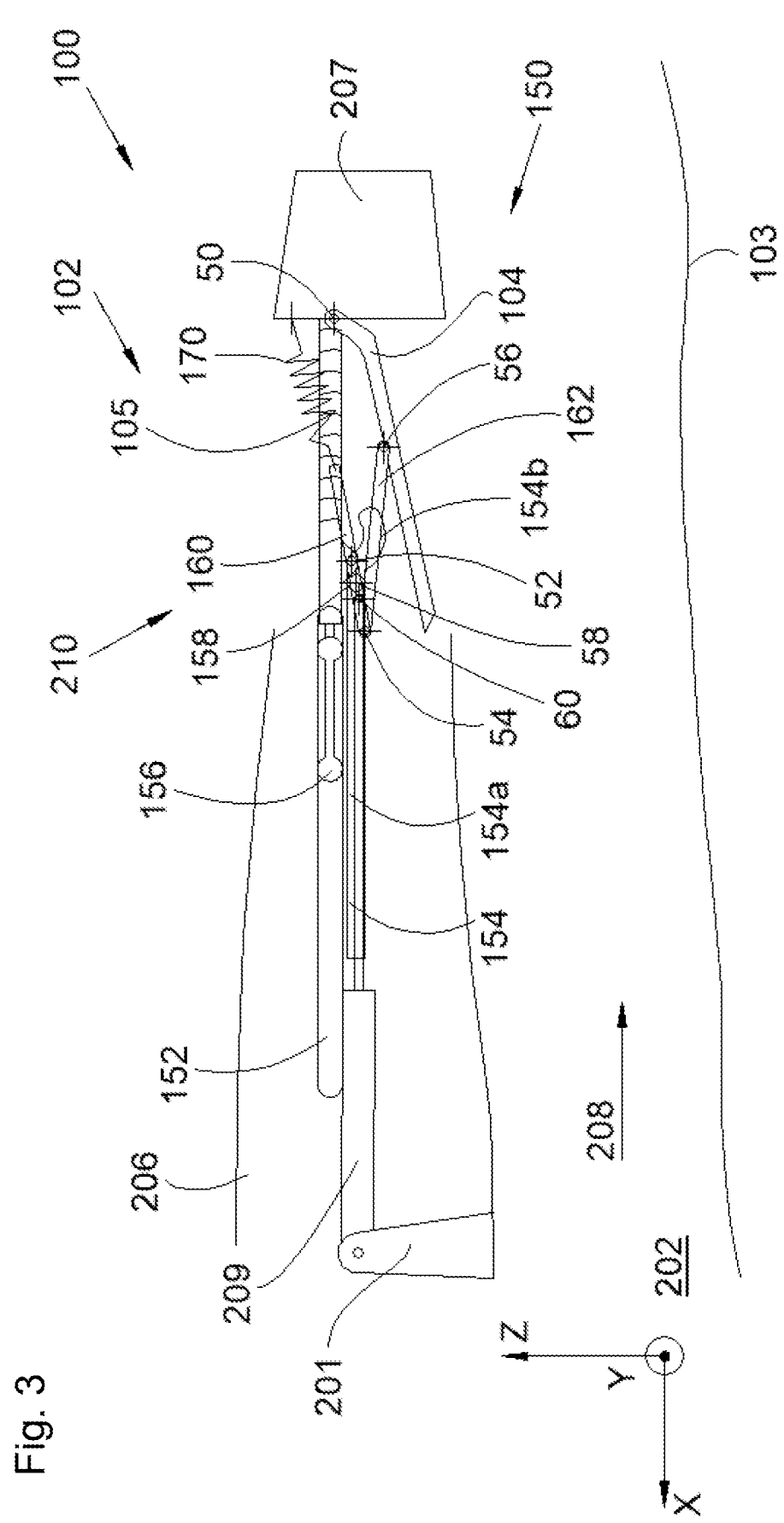
FIG. 3 is a view similar to that of FIG. 2 in the withdrawn position and in the stowed position.

In the following description, terms relating to a position are taken with reference to an aircraft in a position of forward travel, as shown in FIG. 1.

FIG. 1 shows an aircraft 10 that comprises a fuselage 12, on either side of which a wing 14 is fixed which carries at least one bypass turbojet 100 according to the invention. The bypass turbojet 100 is fixed under the wing 14 by means of a pylon 16.

In the following description, and by convention, the longitudinal axis of the bypass turbojet 100, which is parallel to the longitudinal axis of the aircraft 10 and oriented positively in the direction of forward movement of the aircraft 10, is called X, the transverse axis of the bypass turbojet 100, which is horizontal when the aircraft is on the ground, is called Y, and the vertical axis when the aircraft is on the ground is called Z, these three directions X, Y and Z being orthogonal to one another.

FIGS. 2 to 5 show the bypass turbojet 100 that comprises a nacelle 102 and an engine 103 that is housed inside the nacelle 102. The bypass turbojet 100 has a duct 202 between the nacelle 102 and the engine 103 through which the secondary flow 208 circulates. The engine 103 is embodied, here, by means of its exterior wall.

The nacelle 102 comprises at least one reverser flap 104. In particular, there may be two reverser flaps 104 arranged one facing the other, or a plurality of reverser flaps 104 distributed regularly over the periphery of the nacelle 102 such as to block the aerodynamic duct 202 over a given sector. Depending on its position, each reverser flap 104 makes it possible to reverse the thrust of the bypass turbojet 100.

In the following description, the invention is more particularly described in the case of one reverser flap 104, but it applies in the same way to each reverser flap 104 when there is a plurality thereof.

For each reverser flap 104, the nacelle 102 has an opening 210 (FIGS. 3 and 5) open between the duct 202 and the exterior of the nacelle 102. The opening 210 thus connects the duct 202 and the exterior of the nacelle 102.

The nacelle 102 has a fixed cowl 206 that delimits the opening 210 upstream relative to the longitudinal axis X and is mounted immovably on a fixed structure 201 of the nacelle 102.

The nacelle 102 has a movable cowl 207 that delimits the opening 210 downstream relative to the longitudinal axis X. The movable cowl 207 is mounted to move in translation in a translational direction globally parallel to the longitudinal axis X on the fixed structure 201.

The fixed cowl 206 and the movable cowl 207 each have an exterior surface that constitutes the exterior shell of the nacelle 102 and an interior surface that constitutes an exterior wall of the duct 202. The exterior wall of the engine 103 constitutes an interior wall of the duct 202.

The movable cowl 207 can move between an advanced position (FIG. 2), in which it is close to the fixed cowl 206, and a withdrawn position (FIGS. 3 to 5), in which it is remote from the fixed cowl 206 towards the rear such as to enlarge the opening 210.

The nacelle 102 also comprises at least one ram 209 for moving the movable cowl 207 from the advanced position to the withdrawn position, and vice versa.

Each ram 209 is commanded by a control unit, of the processor type, that commands the extension and the shortening of the ram 209 in accordance with the requirements of the aircraft 10. Each ram 209 has a cylinder mounted in an articulated manner on the fixed structure 201 and a rod that can move in translation.

Figure 4:
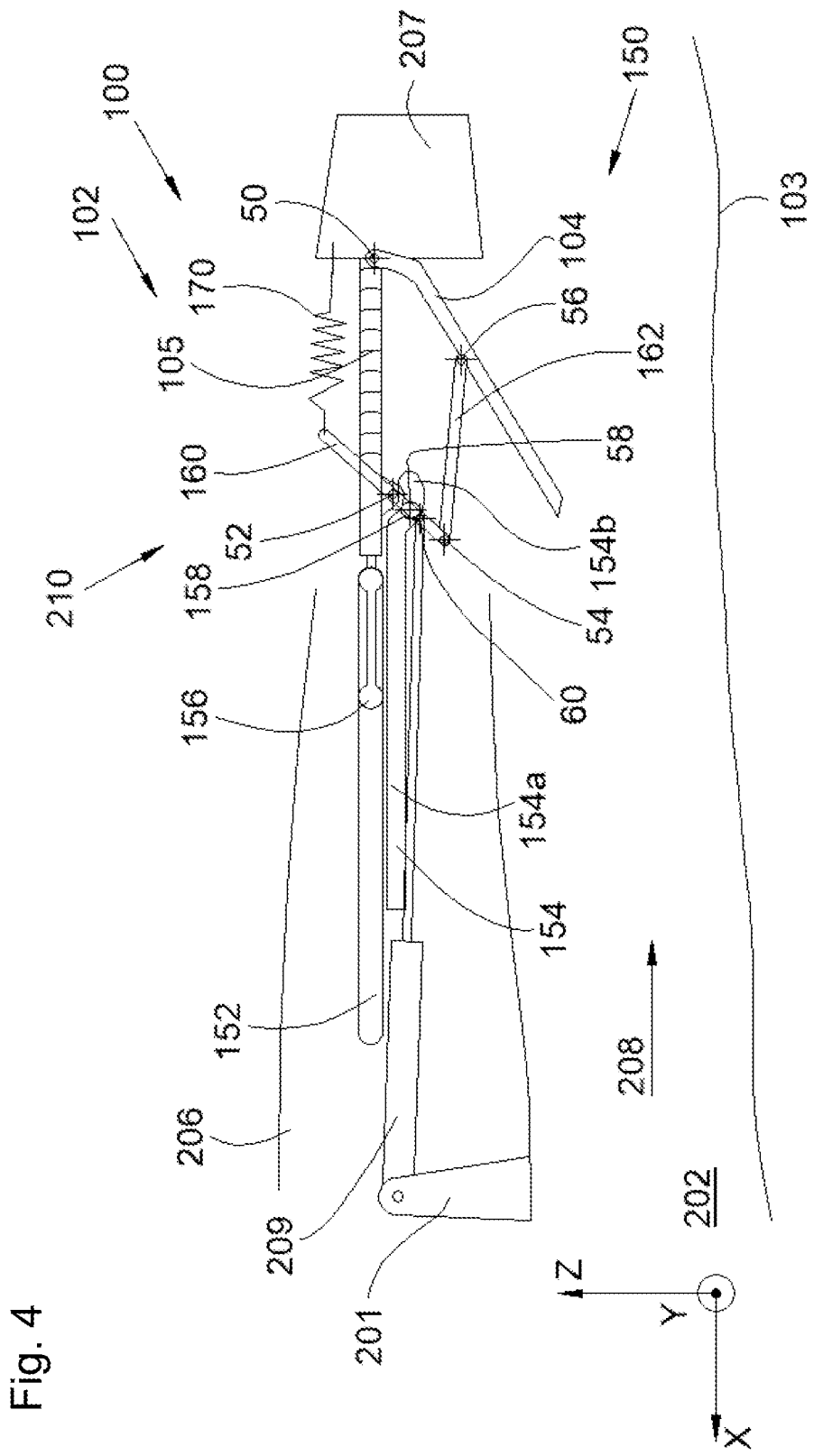
FIG. 4 is a view similar to that of FIG. 2 in the withdrawn position and in an intermediate position.
Figure 5:
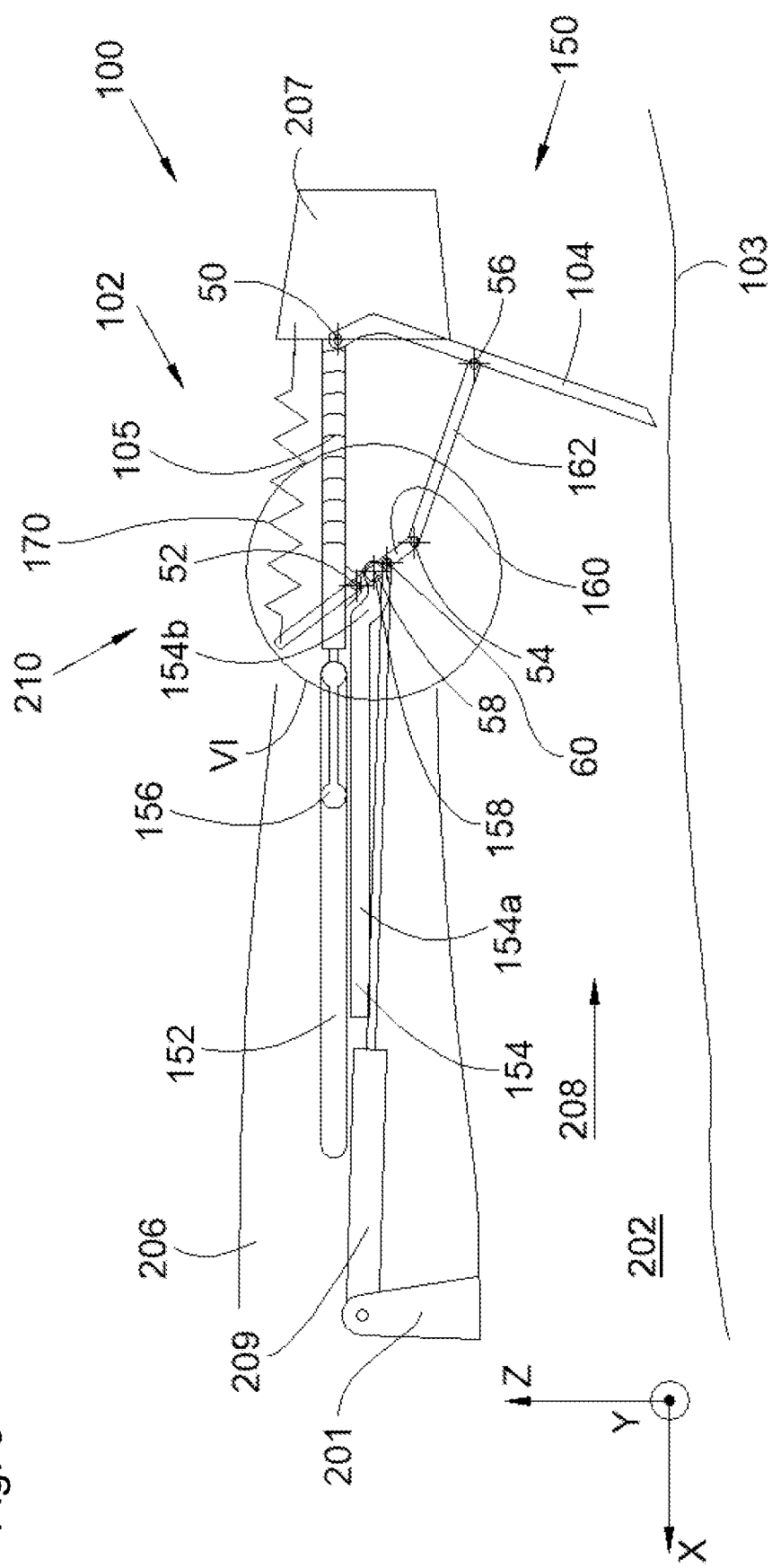
FIG. 5 is a view similar to that of FIG. 2 in the withdrawn position and in the deployed position.

The reverser flap 104 is mounted to move in rotation about a principal axis 50 of rotation on the movable cowl 207 between a stowed position (FIGS. 2 and 3) and a deployed position (FIG. 5), for which thrust reversal has maximum efficiency. FIG. 4 shows an intermediate position between the stowed position and the deployed position. In the embodiment of the invention presented here, the principal axis 50 of rotation is perpendicular to the translational direction. The principal axis 50 of rotation is, here, at the downstream edge of the reverser flap 104.

In the stowed position, the reverser flap 104 is positioned outside the secondary duct 208 and, more particularly, here, inside the fixed cowl 206. In the withdrawn position, the movable cowl 207 is moved rearwards to facilitate the maneuvering of the reverser flap 104, which moves from the stowed position to the deployed position.

When the reverser flap 104 is in the deployed position, the reverser flap 104 lies across the duct 202 and deflects at least a portion of the secondary flow 208 towards the exterior, through the opening 210.

The passage from the stowed position to the deployed position of the reverser flap 104 is coordinated but delayed relative to the passage from the advanced position to the withdrawn position of the movable cowl 207, and vice versa.

Upon passage from the stowed position to the deployed position, the rotation of the reverser flap 104 commences when the movable cowl 207 has reached the withdrawn position. Conversely, upon passage from the deployed position to the stowed position, the rotation of the reverser flap 104 stops when the movable cowl 207 leaves the withdrawn position.

Figure 6:
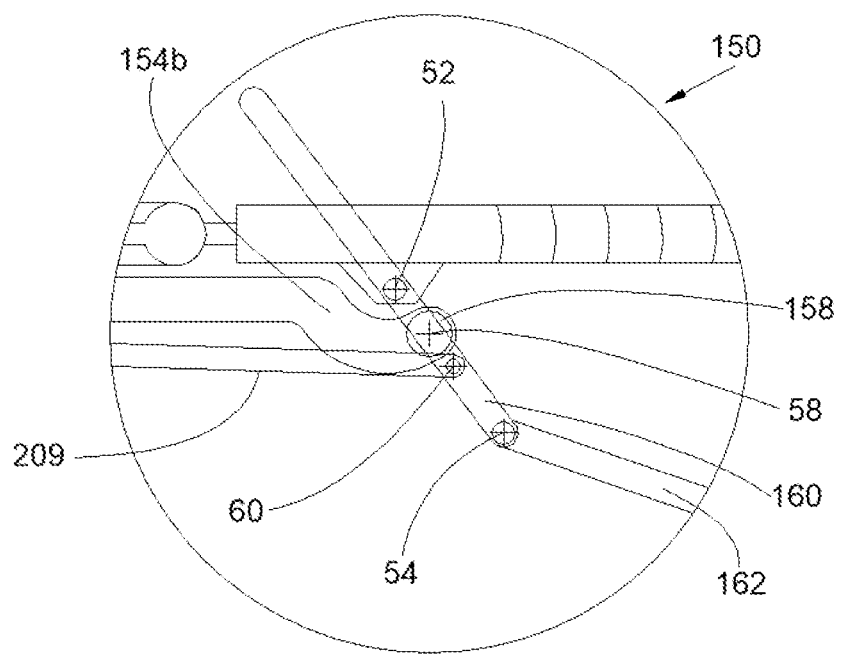
FIG. 6 is an enlargement of detail VI in FIG. 5.

This coordination and this offset are provided by a deployment system 150. FIG. 6 shows an enlargement of a portion of the deployment system 150 according to one embodiment of the invention. The deployment system 150 comprises:

- a first slide bar 156 integral with the movable cowl 207,
- guide means 152 designed to guide the first slide bar 156 in translation parallel to the translational direction relative to the fixed structure 201 between two stop positions, one corresponding to the advanced position and the other to the withdrawn position,
- a first groove 154 comprising a first part 154a parallel to the translational direction and a curved, second part 154b, in which the first groove 154 is integral with the fixed structure 201,
- a second slide bar 158 mounted to move in translation in the first groove 154,
- a first connecting rod 160 mounted to move in rotation on the first slide bar 156 about a first axis 52 of rotation and comprising a first end, in which the first connecting rod 160 is mounted to move in rotation on the second slide bar 158 between the first slide bar 156 and the first end about a second axis 58 of rotation, and
- a second connecting rod 162, a first end of which is mounted in an articulated manner on the first end of the first connecting rod 160 about a third axis 54 of rotation, and a second end of which is mounted in an articulated manner on the reverser flap 104 about a fourth axis 56 of rotation, wherein the rod of the ram 209 is mounted in an articulated manner on the first connecting rod 160, and wherein, when the first slide bar 156 moves from the stop position corresponding to the advanced position to the stop position corresponding to the withdrawn position, being guided by the guide means 152, the second slide bar 158 moves along the first part 154a of the first groove 154 and, from the moment when the first slide bar 156 reaches the withdrawn position, referred to as the "rear stop" position, that is to say one of the stop positions, the second slide bar 158 moves along the second part 154b of the first groove 154.

Conversely, whilst the second slide bar 158 moves along the second part 154b, the first slide bar 156 remains in the withdrawn position, and as soon as the second slide bar 158 moves along the first part 154a, the first slide bar 156 moves from the withdrawn position to the advanced position, being guided by the guide means 152.

Such a deployment system 150 also offers the advantage of being entirely outside the duct 202, when the movable cowl 207 is in the advanced position and when the reverser flap 104 is in the stowed position.

The deployment system 150 thus functions as follows, from the advanced and stowed position:

the rod of the ram 209 is extended, which generates the translational movement of the first slide bar 156 guided by the guide means 152 along the fixed structure 201 such as to move the movable cowl 207 from the advanced position to the withdrawn position, and at the same time the second slide bar 158 moves along the first part 154a, when the first slide bar 156 has reached the withdrawn position, it is stopped in translation in the "rear stop" position, the extension of the rod of the ram 209 is continued, the second slide bar 158 moves along the second part 154b, which owing to its curved form gives rise to a rotational movement of the first connecting rod 160 about the first axis 52 of rotation, and thus the deployment of the second connecting rod 162 and of the reverser flap 104, which passes from the stowed position to the deployed position.

The deployment system 150 thus functions as follows, from the withdrawn and deployed position:

the rod of the ram 209 is shortened, which gives rise to the movement of the second slide bar 158 along the second part 154b and thus the rotation of the first connecting rod 160 in the opposite direction such as to re-place the reverser flap 104, which passes from the deployed position to the stowed position, when the second slide bar 158 reaches the first part 154a, the shortening of the rod of the ram 209 continues, the first slide bar 156, guided by the guide means 152, then moves along the fixed structure 201 such as to move the movable cowl 207 from the withdrawn position to the advanced position and, at the same time, the second slide bar 158 moves along the first part 154a to arrive at the initial, advanced and stowed position.

The articulation about the second axis 58 of rotation releases the second slide bar 158 upon movement of the first connecting rod 160.

The particular form of the first slide 154 allows an offset between the translation of the movable cowl 207 and the rotation of the reverser flap 104.

Furthermore, the deployment system 150 is exclusively outside the movable cowl 207, which may be dedicated to acoustic treatment.

In the embodiment of the invention presented here, the guide means 152 take the form of a second groove 152 in and along which the first slide bar 156 slides. The second groove 152 is arranged along an axis parallel to the translational direction and is integral with the fixed structure 201. The ends of the second groove 152 are blocked such as to limit the movement of the first slide bar 156 between said ends and thus to determine the position of the two stop positions.

In the embodiment of the invention presented here, the rod of the ram 209 is mounted in an articulated manner on the first connecting rod 160 between the first end and the second axis 58 of rotation and about a fifth axis 60 of rotation.

All the axes 52, 54, 56, 58 and 60 of rotation are parallel to the principal axis 50 of rotation.

In the embodiment of the invention shown in FIGS. 2 to 5, cascades 105 are integral with the movable cowl 207 and, in the withdrawn position, they are positioned across the opening 210 such as to orient the secondary flow 208 optimally.

To facilitate the return of the first connecting rod 160 upon movement from the deployed position, the first connecting rod 160 has a second end that is on the other side from the first end relative to the first axis 52 of rotation, and the deployment system 150 comprises a compensation system 170, presented, here, in the form of a draw spring 170, fixed between the second end and the movable cowl 207. The compensation system 170 is active during the phase of deployment of the reverser flaps 104 in the duct 202. The compensation system 170 compensates at least in part for the aerodynamic flow forces applied to the reverser flaps 104 and it also assists the ram 209 in terms of the return of the reverser flaps 104 towards the stowed position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a bypass turbojet, said nacelle comprising:
a fixed structure,
a fixed cowl mounted immovably on the fixed structure and a movable cowl that is movable in translation relative to the fixed structure in a translational direction between an advanced position, in which the movable cowl is close to the fixed cowl, and a withdrawn position, in which the movable cowl is remote from the fixed cowl towards a rear of the fixed structure, such as to define therebetween an opening connecting a duct of a secondary flow and an exterior of the nacelle,
a ram configured to move the movable cowl from the advanced position to the withdrawn position, and vice versa,
a reverser flap mounted to move in rotation about a principal axis of rotation on the movable cowl, between a stowed position in which the reverser flap is positioned outside the duct of the secondary flow and a deployed position in which the reverser flap is across the duct of the secondary flow, and
a deployment system provided such as to coordinate and to delay passage from the stowed position to the deployed position of the reverser flap with passage from the advanced position to the withdrawn position of the movable cowl, and vice versa, said deployment system comprising:
a first slide bar integral with the movable cowl,
a guide configured to guide the first slide bar in translation parallel to the translational direction relative to the fixed structure between two stop positions, one corresponding to the advanced position and the other to the withdrawn position,
a first groove comprising a first part parallel to the translational direction and a curved, second part, in which the first groove is integral with the fixed structure,
a second slide bar mounted to move in translation in the first groove,
a first connecting rod mounted to move in rotation on the first slide bar about a first axis of rotation and comprising a first end, in which the first connecting rod is mounted to move in rotation on the second slide bar between the first slide bar and the first end about a second axis of rotation, and
a second connecting rod, a first end of which is mounted in an articulated manner on the first end of the first connecting rod about a third axis of rotation, and a second end of the second connecting rod is mounted in an articulated manner on the reverser flap about a fourth axis of rotation,
wherein a rod of the ram is mounted in an articulated manner on the first connecting rod, and
wherein, when the first slide bar moves from the stop position corresponding to the advanced position to the stop position corresponding to the withdrawn position, being guided by the guide, the second slide bar moves along the first part of the first groove and, from a moment when the first slide bar reaches the withdrawn position, the second slide bar moves along the second part of the first groove.

2. The nacelle according to claim 1, wherein a movement of the second slide bar along the second part of the first groove, due to the curved form of the second slide bar, gives rise to a rotational movement of the first connecting rod about the first axis of rotation, and thus a deployment of the second connecting rod and of the reverser flap, which passes from the stowed position to the deployed position.

3. The nacelle according to claim 1, wherein the guide takes the form of a second groove in and along which the first slide bar slides, wherein the second groove is arranged along an axis parallel to the translational direction and is integral with the fixed structure, and wherein opposite ends of the second groove are blocked such as to limit a movement of the first slide bar between said opposite ends of the second groove.

4. The nacelle according to claim 1, wherein the rod of the ram is mounted in the articulated manner on the first connecting rod between the first end of the first connecting rod and the second axis of rotation and about a fifth axis of rotation.

5. The nacelle according to claim 1, wherein the first axis of rotation, the second axis of rotation, the third axis of rotation, the fourth axis of rotation and the fifth axis of rotation are each parallel to the principal axis of rotation.

6. The nacelle according to claim 1, further comprising cascades integral with the movable cowl, and wherein, in the withdrawn position, the cascades are positioned across the opening.

7. The nacelle according to claim 1, wherein the first connecting rod has a second end that is on the other side of the first end relative to the first axis of rotation and wherein the deployment system comprises a draw spring fixed between the second end of the first connecting rod and the movable cowl.

8. A bypass turbojet comprising an engine and the nacelle according to claim 1 that surrounds the engine, and wherein the duct of the secondary flow is delimited between the nacelle and the engine.

9. An aircraft comprising at least one of the bypass turbojet according to claim 8.

* * * * *